(12) United States Patent
Chacko

(10) Patent No.: US 8,310,816 B2
(45) Date of Patent: Nov. 13, 2012

(54) SOLID ELECTROLYTIC CAPACITORS WITH IMPROVED RELIABILITY

(75) Inventor: Antony P. Chacko, Greer, SC (US)

(73) Assignee: Kemet Electronics Corporation, Greenville, SC (US)

( * ) Notice: Subject to any disclaimer, the term of this patent is extended or adjusted under 35 U.S.C. 154(b) by 386 days.

(21) Appl. No.: 12/469,786

(22) Filed: May 21, 2009

(65) Prior Publication Data

US 2010/0296227 A1    Nov. 25, 2010

(51) Int. Cl.
*H01G 9/04* (2006.01)
*H01G 9/145* (2006.01)
*H01G 9/00* (2006.01)

(52) U.S. Cl. ........................ 361/532; 361/523

(58) Field of Classification Search .......... 361/532, 361/523
See application file for complete search history.

(56) References Cited

U.S. PATENT DOCUMENTS

| | | | |
|---|---|---|---|
| 4,000,046 A | 12/1976 | Weaver | 204/38 |
| 4,104,704 A | 8/1978 | Weaver | 361/433 |
| 4,571,664 A * | 2/1986 | Hyland | 361/540 |
| 4,794,491 A * | 12/1988 | Saiki | 361/532 |
| 4,812,951 A | 3/1989 | Melody et al. | 361/504 |
| 5,036,434 A * | 7/1991 | Kobayashi | 361/540 |
| 5,185,075 A | 2/1993 | Rosenberg et al. | 205/234 |
| 5,390,074 A * | 2/1995 | Hasegawa et al. | 361/540 |
| 5,716,511 A | 2/1998 | Melody et al. | 205/324 |
| 6,346,127 B1 * | 2/2002 | Kuriyama | 29/25.03 |
| 6,381,121 B1 | 4/2002 | Monden et al. | 361/525 |
| 6,464,738 B1 * | 10/2002 | Shimizu et al. | 29/25.03 |
| 6,480,371 B1 | 11/2002 | Kinard et al. | 361/508 |
| 6,580,601 B2 * | 6/2003 | Hamada et al. | 361/523 |
| 2009/0290280 A1 * | 11/2009 | Takeuchi et al. | 361/303 |

FOREIGN PATENT DOCUMENTS

| | | |
|---|---|---|
| EP | 470563 A1 * | 2/1992 |
| GB | 2 168 383 | 12/1985 |
| JP | 05021279 A * | 1/1993 |

OTHER PUBLICATIONS

International Search Report and Written Opinion, PCT/US2010/035858, Dec. 6, 2010, Roh Choon Park.

* cited by examiner

*Primary Examiner* — David M Sinclair
(74) *Attorney, Agent, or Firm* — Joseph T. Guy; Nexsen Pruet, LLC

(57) ABSTRACT

A capacitor with an anode, a dielectric on the anode and a cathode on the dielectric. A transition layer is on the cathode wherein the transition layer has a blocking layer. A plated layer is on the transition layer. The cathode is electrically connected to a cathode termination through the transition layer.

68 Claims, 3 Drawing Sheets

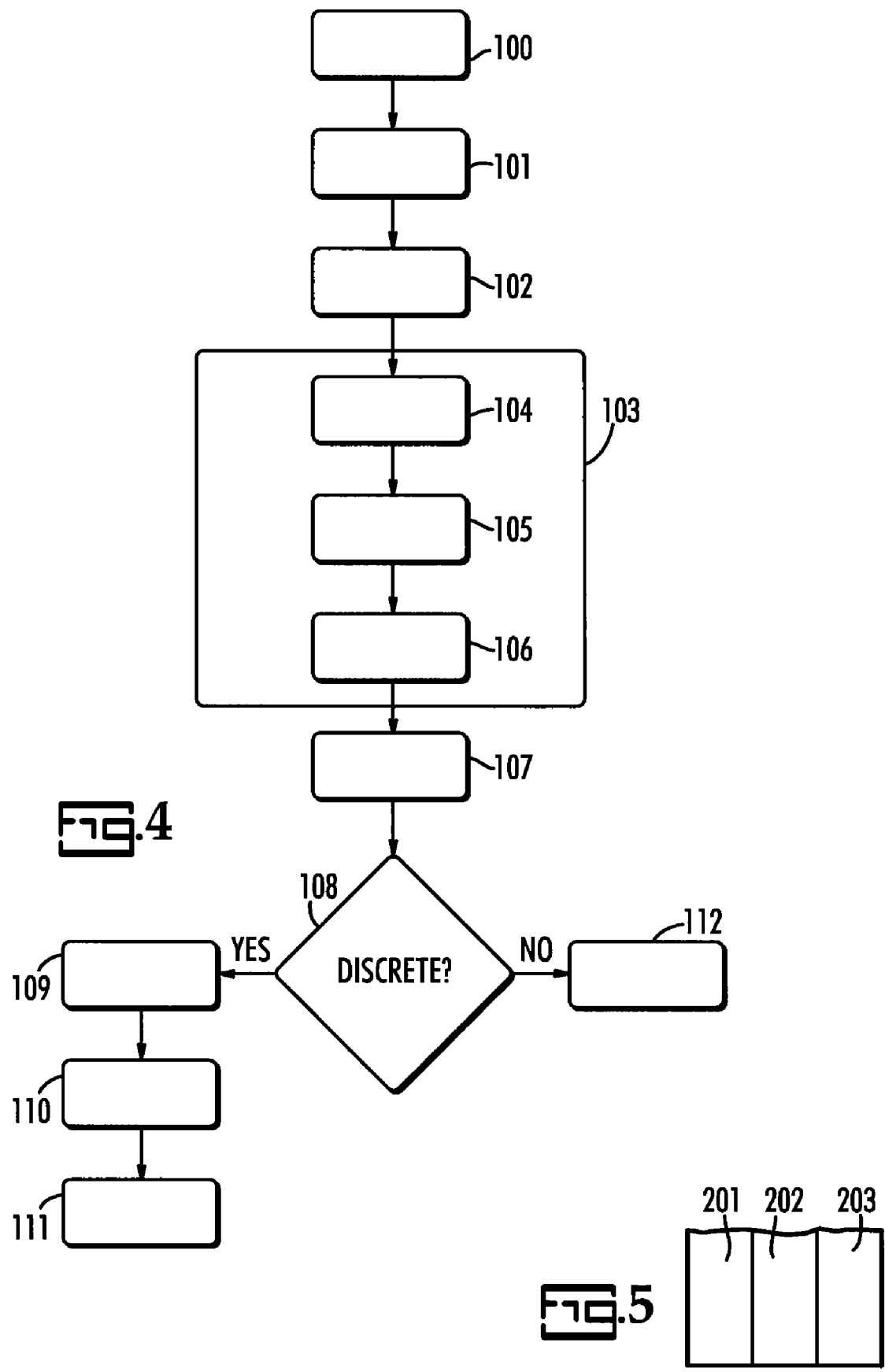

SOLID ELECTROLYTIC CAPACITORS WITH IMPROVED RELIABILITY

BACKGROUND

The present invention is related to an improved method of forming a solid electrolyte capacitor and an improved capacitor formed thereby. More specifically, the present invention is related to an improved method of electrically connecting a cathode to a cathode lead in a capacitor and an improved capacitor formed thereby.

The construction and manufacture of solid electrolyte capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal is electrolytically formed to cover all surfaces of the anode and serves as the dielectric of the capacitor. The solid cathode electrolyte is typically chosen from a very limited class of materials, to include manganese dioxide or electrically conductive organic materials such as 7,7',8,8'-tetracyanoquinonedimethane (TCNQ) complex salt, or intrinsically conductive polymers, such as polyaniline, polypyrol, polythiophene and their derivatives. The solid cathode electrolyte is applied so that it covers all dielectric surfaces. An important feature of the solid cathode electrolyte is that it can be made more resistive by exposure to high temperatures. This feature allows the capacitor to heal leakage sites by Joule heating. In addition to the solid electrolyte the cathode of a solid electrolyte capacitor typically consists of several layers which are external to the anode body. In the case of surface mount constructions these layers typically include: a carbon layer; a layer containing a highly conductive metal, typically silver, bound in a polymer or resin matrix; a conductive adhesive layer such as silver filled adhesive; and a highly conductive metal lead frame. The various layers connect the solid electrolyte to the outside circuit and also serve to protect the dielectric from thermo-mechanical damage that may occur during subsequent processing, board mounting, or customer use.

In the case of conductive polymer cathodes the conductive polymer is typically applied by either chemical oxidation polymerization, electrochemical oxidation polymerization or spray techniques with other less desirable techniques being reported.

The carbon layer serves as a chemical barrier between the solid electrolyte and the silver layer. Critical properties of the layer include adhesion to the underlying layer, wetting of the underlying layer, uniform coverage, penetration into the underlying layer, bulk conductivity, interfacial resistance, compatibility with the silver layer, buildup, and mechanical properties.

The silver layer serves to conduct current from the lead frame to the cathode and around the cathode to the sides not directly connected to the lead frame. The critical characteristics of this layer are high conductivity, adhesive strength to the carbon layer, wetting of the carbon layer, and acceptable mechanical properties. Compatibility with the subsequent layers employed in the assembly and encapsulation of the capacitor are also critical. In the case where a silver filled adhesive is used to attach to a lead frame compatibility between the lead frame and the silver filled adhesive is necessary. In capacitors which utilize solder to connect to the external lead, solderability and thermal stability are important factors. In order for the solder to wet the silver layer, the resin in the silver must degrade below the temperature at which the solder is applied. However, excessive degradation of the resin creates an effect termed "silver leeching" resulting in a poor connection between the external cathode layers and the external cathode lead. The traditional approach to applying a silver layer requires a delicate compromise in thermal stability of the resin in order to simultaneously achieve solder wetting and to avoid silver leeching. The silver layer is secured to a cathode lead frame by an adhesive. The adhesive is typically a silver filled resin which is cured after the capacitor is assembled.

Reliability of the capacitors requires that the interface between the silver layer and carbon layer and the interface between the silver layer and adhesive layer have good mechanical integrity during thermo mechanical stresses. Solid electrolytic capacitors are subject to various thermomechanical stresses during assembly, molding, board mount reflow etc. A weak interface with the silver layer can cause delamination of the layers which causes reliability issue. Solid electrolytic capacitors are also required to have good environmental properties such as good chemical and moisture resistance. Reliability issues caused by silver migration under humid conditions are known in the electronics industry. Silver metal from the silver layer can migrate to the anode causing high leakage current. Due to these problems, elimination of the silver layer is desired by solid electrolytic capacitor manufacturers. Other methods for forming a conductive metal surface on the carbon layer are sputtering and electroplating.

U.S. Pat. Nos. 4,000,046, and 4,104,704 teach an electroplating method for solid electrolytic capacitors. Electroplating was performed on water based graphite coatings and silver paint coatings. Experiments to reproduce the method of this disclosure showed significant reliability issues such as high leakage current and electrical shorts. Investigations to understand this suggest that the diffusion of the plating electrolyte through this hydrophilic and porous conductive layer to the semi conductive layer and anode is influencing the reliability. It is also found that the top of the anode with no carbon layer provides significantly more permeability for the plating electrolyte diffusion. Through diligent research the present inventor has developed an electroplating method which circumvents the problems encountered in the prior art.

SUMMARY

It is an object of the present invention to provide a solid electrolytic capacitor with improved reliability by using an improved transition layer between the cathode and plated layer.

A particular feature of the improved cathode is the improved reliability.

It is another object of the present invention to provide a capacitor comprising the improved cathode structure wherein the capacitor has improved properties owing to the decreased leakage current due to the presence of a blocking layer, within the transition layer, which prevents diffusion of electrolyte into the anode.

In a particularly preferred embodiment the blocking layer is either a hydrophobic layer or an insulating layer.

It is another object of the present invention to provide first and second conductive carbon layers wherein the first conductive carbon layer has good wettability to a semiconductive surface and the second conductive carbon layer has good wettability to an insulative or hydrophobic surface and excellent adhesion to a plated metal layer.

It is another object of the present invention to provide a capacitor comprising the improved plated cathode wherein the capacitor has improved properties owing to the improved adhesion between the carbon layer and the plated cathode layer.

It is another object of the present invention to provide an improved method for manufacturing capacitors.

It is another object of the present invention to provide a capacitor with improved conduction between conductive layers and the lead frame without detriment to the adhesion between these layers.

A particular feature of the present invention is the ability to provide the improvements with minor changes in the manufacturing process and with improved yields.

These and other advantages, as will be realized, are provided in a capacitor. The capacitor has an anode, a dielectric on the anode and a cathode on the dielectric. A transition layer is on the cathode wherein the transition layer has a blocking layer. A plated layer is on the transition layer. The cathode is electrically connected to a cathode termination through the transition layer.

Yet another embodiment is provided in a method for forming a capacitor. The method includes:
providing an anode;
forming a dielectric on the anode;
applying a cathode on the dielectric;
applying a transition layer on the cathode wherein the transition layer comprises a blocking layer;
plating a layer on the transition layer; and
electrically connecting a cathode termination to the cathode through the transition layer.

Yet another embodiment is provided in an improved capacitor. The capacitor has an anode, a dielectric on the anode, a cathode on the dielectric, a blocking layer on the cathode and a plated layer on the blocking layer. The cathode is electrically connected to a cathode termination through the blocking layer.

BRIEF DESCRIPTION OF THE DRAWINGS

FIG. 4 is a schematic illustration of an embodiment of the present invention.

FIG. 5 is a partial cross-sectional view of an embodiment of the present invention.

DETAILED DESCRIPTION

The present invention mitigates the deficiencies of the prior art by providing an improved transition layer between the cathode and plated layer. The improved transition layer increases productivity without detriment to the electrical properties of the capacitor. The present invention will be described with reference to the various figures which illustrate, without limiting, the invention. Throughout the description similar elements will be numbered accordingly.

Figure 1:
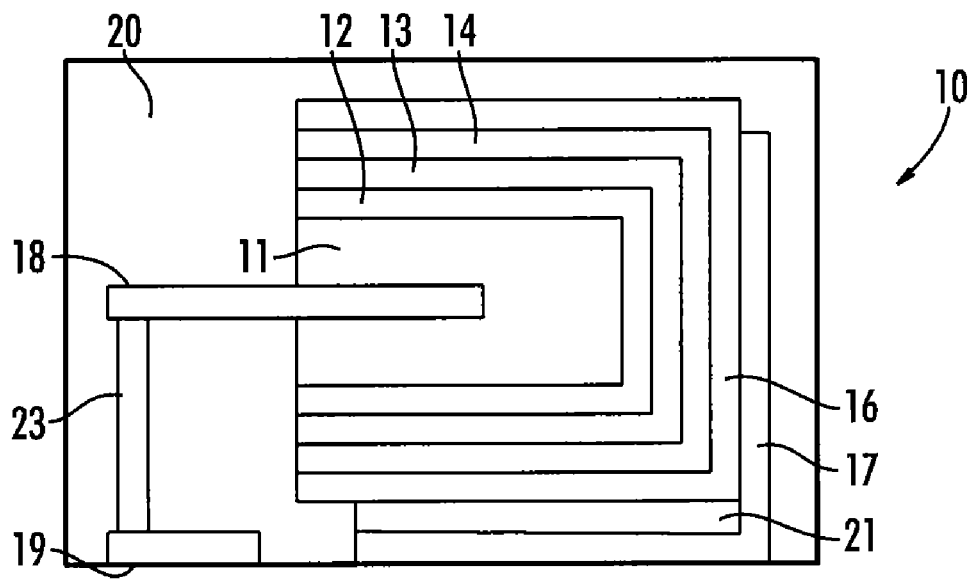
FIG. 1 is a cross-sectional schematic view of a prior art capacitor.

FIG. 1 illustrates a cross-sectional schematic view of a prior art capacitor generally represented at 10. The capacitor comprises an anode, 11, preferably comprising a valve metal as described further herein with an anode wire, 18, extending there from. A dielectric layer, 12, is provided on the surface of the anode, 11. Coated on the surface of the dielectric layer, 12, is a cathode layer, 13. A carbon layer, 14, and plated metal layer, 16, provide electrical conductivity and provide a surface which is more readily adhered to the cathode terminal, 17, than is the cathode layer, 13. The layers between the cathode, 13, and plated layer, 16, are referred to collectively herein as the transition layer which typically includes multiple layers designed to allow adhesion on one face to a polymeric cathode and on the other face to the plated layer, 16. An adhesive layer, 21, secures the cathode lead to the transition layer. The anode wire, 18, is electrically connected to the anode terminal, 19, by a connector, 23, which may be integral to a lead frame. The entire element, except for the terminus of the terminals, is then preferably encased in a non-conducting material, 20, such as an epoxy resin.

The present invention is primarily directed to the improved transition layer. Included in the transition layer is a blocking layer, preferably selected from a hydrophobic layer and an insulative layer, which inhibits migration of metals and metal ions towards the dielectric. In a particularly preferred embodiment the blocking layer is between first and second carbon layers.

Figure 2:
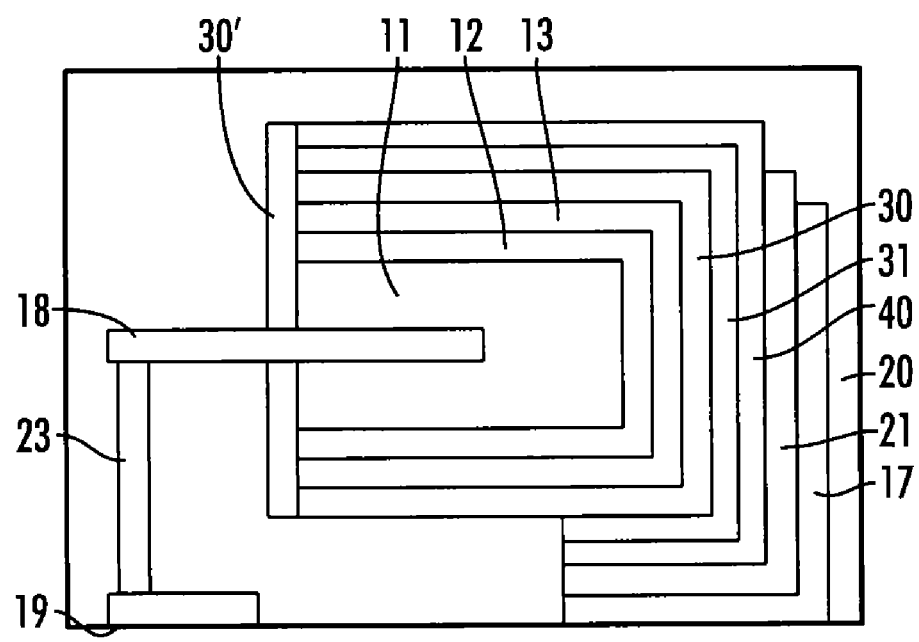
FIG. 2 is a cross-sectional schematic view of an embodiment of the invention.

An embodiment of the present invention is illustrated schematically in FIG. 2 at 50. In FIG. 2 the anode, 11; dielectric, 12; cathode, 13; cathode termination, 17; anode wire, 18; anode termination, 19; non-conducting material, 20; and connector, 23, are as illustrated relative to FIG. 1. Layer 16' is a plated layer as will be more fully described herein. The transition layer, 30, comprises a blocking layer as will be more fully described herein. The transition layer preferably encases the entire underlying structure. A second transition layer, 30', which preferably comprises a second blocking layer, is preferably disposed on at least a portion of the surface of the underlying monolith from which the anode wire, 18, extends. The second blocking layer may be the same as the blocking layer of the transition layer but extended beyond the area of the transition layer. Alternatively, the second blocking layer may be a layer which is different from the blocking layer of the transition layer.

The function of the transition layer is to electrically connect the cathode, 13, to the plated metal layer, 16' (?), while inhibiting metal and metal ions from migrating there through. One surface of the transition layer must be compatible with the cathode layer and the opposing surface must be compatible with the cathode termination or an adhesion layer attaching the transition layer to the cathode termination. To accomplish these tasks the transition layer is typically a multiplicity of layers preferably starting with a carbon based layer, for adhesion directly to the cathode and subsequent adhesion to metal layers, followed by metal layers for adhesion to the carbon and cathode termination or adhesive layer.

Figure 3:
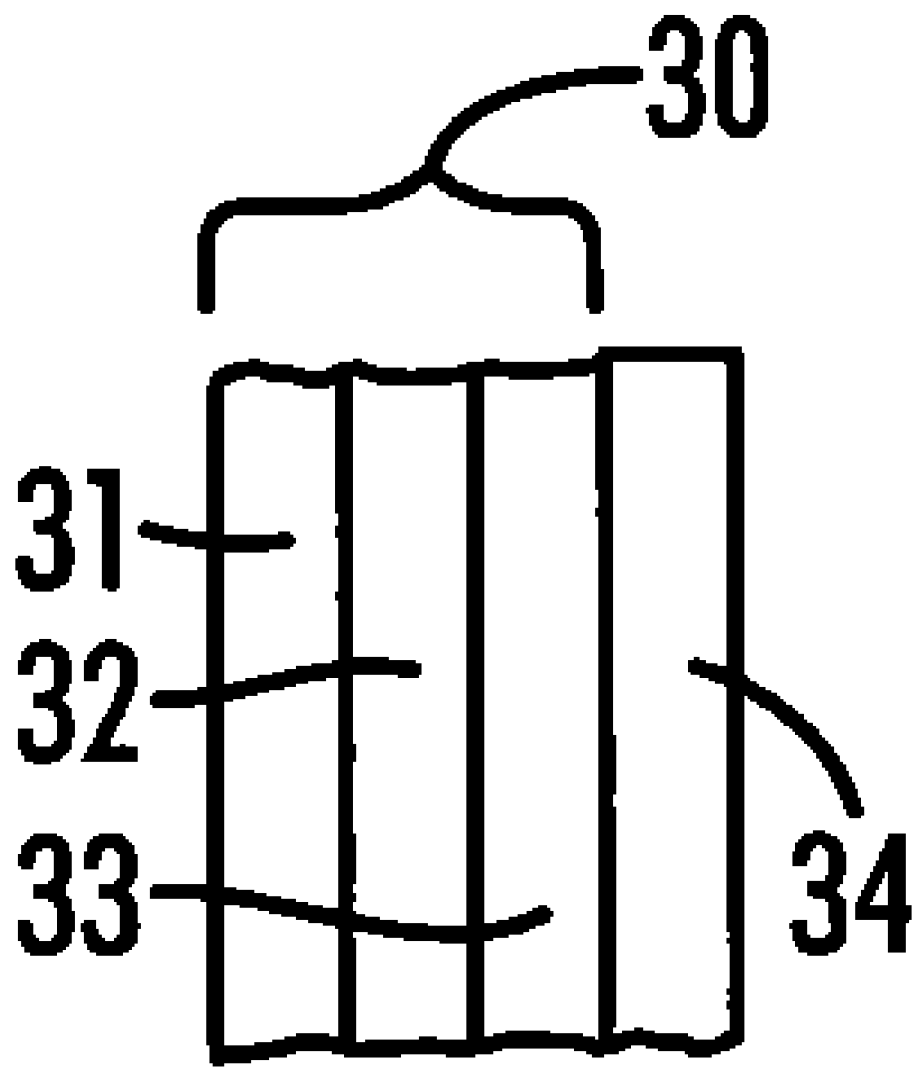
FIG. 3 is a partial cross-sectional schematic view of a preferred transition layer of the present invention.

An embodiment of the transition layer is illustrated in FIG. 3 wherein a cross-sectional portion of the transition layer, 30, and plated metal layer, 34, is shown in isolation. The preferred transition layer comprises a first carbon layer, 31, which is formulated to adhere adequately to the cathode while still having adequate conductivity through the layer. A blocking layer, 32, is provided which inhibits the metal ion in the electroplating electrolyte from migrating into or through the blocking layer. It is preferred that no metal migrates through the blocking layer. In practice, minute amounts may migrate which is undesirable but acceptable. The blocking layer will be described more thoroughly herein. A second carbon layer, 33, is formulated to provide adhesion to the blocking layer and to the plated metal layer, 34. The plated metal layer, 34, is the eventual contact point within a circuit and is electrically connected to a cathode lead or to a circuit trace preferably by a conductive adhesive. The blocking layer is preferably between two carbon layers since this provides maximum adhesion. The blocking layer could be between a carbon layer and a metal layer or between the cathode and a carbon layer. In an alternative embodiment the carbon layer may be a blocking layer. The blocking layer is preferably a hydrophobic layer or an insulative layer.

The cathode layer is a conductive layer preferably comprising conductive polymer, such as polythiophene, polyaniline, polypyrrole or their derivatives; manganese dioxide, lead oxide or combinations thereof. An intrinsically conducting polymer is most preferred.

A particularly preferred conducting polymer is illustrated in Formula I:

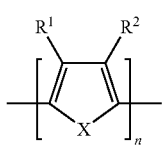

FORMULA 1

$R^1$ and $R^2$ of Formula 1 are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups are small to avoid steric interferences. For these reasons $R^1$ and $R^2$ taken together as —O—$(CH_2)_2$—O— is most preferred.

In Formula 1, X is S or N and most preferable X is S.

$R^1$ and $R^2$ independently represent linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl, $C_1$-$C_6$ alkoxy, halogen or $OR^3$; or $R^1$ and $R^2$, taken together, are linear $C_1$-$C_6$ alkylene which is unsubstituted or substituted by $C_1$-$C_6$ alkyl, $C_1$-$C_6$ alkoxy, halogen, $C_3$-$C_8$ cycloalkyl, phenyl, benzyl, $C_1$-$C_4$ alkylphenyl, $C_1$-$C_4$ alkoxyphenyl, halophenyl, $C_1$-$C_4$ alkylbenzyl, $C_1$-$C_4$ alkoxybenzyl or halobenzyl, 5-, 6-, or 7-membered heterocyclic structure containing two oxygen elements. $R^3$ preferably represents hydrogen, linear or branched $C_1$-$C_{16}$ alkyl or $C_2$-$C_{18}$ alkoxyalkyl; or are $C_3$-$C_8$ cycloalkyl, phenyl or benzyl which are unsubstituted or substituted by $C_1$-$C_6$ alkyl.

The conducting polymer is preferably chosen from polypyrroles, polyanilines, polythiophenes and polymers comprising repeating units of Formula I, particularly in combination with organic sulfonates: A particularly preferred polymer is 3,4-polyethylene dioxythiophene (PEDT). The polymer can be applied by any technique commonly employed in forming layers on a capacitor including dipping, spraying oxidizer dopant and monomer onto the pellet or foil, allowing the polymerization to occur for a set time, and ending the polymerization with a wash. The polymer can also be applied by electrolytic deposition as well known in the art.

The manganese dioxide layer is preferably obtained by immersing an anode element in an aqueous manganese nitrate solution. The manganese oxide is then formed by thermally decomposing the nitrate at a temperature of from 200 to 350° C. in a dry or steam atmosphere. The anode may be treated multiple times to insure optimum coverage.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

The first carbon layer and second carbon layer, which may be the same or different, each comprises a conductive composition comprising resin and conductive carbon particles. Each carbon layer may individually also comprise adjuvants such as crosslinking additives, surfactants and dispersing agents. The resin, conductive carbon particles and adjuvants are preferably dispersed in an organic solvent or water to form a coating solution. The solvent and resin for the first conductive carbon layer needs to have good wettability to the semiconductive cathode surface.

The blocking layer is most preferably less than two microns thick. Above about two microns the resistivity of the layer exceeds acceptable limits thereby defeating one of the purposes of the transition layers. The lower limit of thickness is set by the coating technique with a monolayer on the entire surface being the theoretical limit. This theoretical limit is difficult to reach with most coating techniques due to the presence of surface vacancies wherein the blocking properties are compromised. Since the blocking layer is a poorly conducting layer its presence necessarily increases resistance between the cathode and cathode lead which is undesirable.

The hydrophobic coating preferably comprises hydrophobic polymers. Silicone and their copolymers, fluorinated polymers and their copolymers are mentioned as being particularly preferred. The hydrophobic layer may include fillers such as silica. Nanoclay and related materials modified with a hydrophobic coating is particularly suitable for demonstration of the invention. The hydrophobic coating is preferably a thermoset coating with high cross link density. The hydrophobic coating is chosen such that the plating electrolyte has very low wettability to the coated surface. In addition to providing low wettability the high cross link density prevents diffusion of plating electrolyte through this coating layer.

A second carbon layer is preferably applied over the blocking layer. Since the blocking layer is designed to have low wettability to aqueous based systems, a water based carbon coating has very low adhesion to this surface. A solvent based carbon coating is preferred for this application. The solvent and resin of the carbon coating is chosen such that the coating can adequately wet the blocking layer which is typically a hydrophobic surface. In addition to wetting, the binder of the second carbon coating needs to have strong adhesion to the binder in the blocking layer as well as to the metal layer. The second carbon coating is preferably highly conductive to enable a faster rate of plating of the metal layer. In addition to the carbon particles such as graphite, carbon black, carbon nanotubes, graphene, metal particles can also be added to improve conductivity.

Preferred resins for the carbon layers are polymers of materials selected from the group phenolic, phenoxy, epoxy, acrylic, cellulose derivatives, aromatic cyanate esters, diallyl isophthalate, bismaleimide, polyimides, polyamide imides, polysulfones, polyphylenes, polyether sulfones, polyaryl ethers, polyphenylene sulfides, polyarylene ether ketones, polyether imides, polyquinoxalines, polyquinolines, polybenzimidazoles, polybenzoxazoles, polybenzothiazoles, and silicones such as silicone polyester and silicone epoxy. More preferably the resin is selected from cellulose derivatives, acrylic, polyester, aromatic cyanate ester, epoxy, phenolic, diallyl isophthalate, phenoxy, polyimide and bismaleimide.

The plated metal layer is preferably applied to the second carbon coating. Plating can be done with various metallic systems. Nickel is a preferred metal system. Plating can be done either by electroplating or electroless plating. Electroplating is preferred due to the lower production cycle time. Conductive adhesive is typically used to adhesively attach the metal layer to the lead frame which acts as the cathode lead or to a circuit trace.

A preferred process for forming the capacitor is illustrated in FIG. 4.

In FIG. 4, the anode is formed, 100, preferably from a valve metal as described further herein.

The anode is a conductor preferably selected from a valve metal or a conductive metal oxide. More preferably the anode comprises a valve metal, a mixture, alloy or conductive oxide of a valve metal preferably selected from Al, W, Ta, Nb, Ti, Zr and Hf. Most preferably the anode comprises at least one material selected from the group consisting of Al, Ta, Nb and NbO. Conductive polymeric materials may be employed as an anode material. Particularly preferred conductive polymers include polypyrrole, polyaniline and polythiophene. Aluminum is typically employed as a foil while tantalum is typically prepared by pressing tantalum powder and sintering to form a compact. For convenience in handling, the valve metal is typically attached to a carrier thereby allowing large numbers of elements to be processed at the same time.

The anode is preferably etched to increase the surface area particularly if the anode is a valve metal foil such as aluminum foil. Etching is preferably done by immersing the anode into at least one etching bath. Various etching baths are taught in the art and the method used for etching the anode is not limited herein.

The anode wire is preferably attached to the anode, particularly when a compact is employed. The anode wire can be attached by welding or by embedding into the powder prior to pressing. A valve metal is a particularly suitable anode wire and in a preferred embodiment the anode and anode wire are the same material.

A dielectric is formed, 101, on the surface of the anode. The dielectric is a non-conductive layer which is not particularly limited herein. The dielectric may be a metal oxide or a ceramic material. A particularly preferred dielectric is the oxide of a metal anode due to the simplicity of formation and ease of use. The dielectric layer is preferably an oxide of the valve metal as further described herein. It is most desirable that the dielectric layer be an oxide of the anode. The dielectric is preferably formed by dipping the anode into an electrolyte solution and applying a positive voltage to the anode. Electrolytes for the oxide formation are not particularly limiting herein but exemplary materials can include ethylene glycol; polyethylene glycol dimethyl ether as described in U.S. Pat. No. 5,716,511; alkanolamines and phosphoric acid, as described in U.S. Pat. No. 6,480,371; polar aprotic solvent solutions of phosphoric acid as described in U.K. Pat. No. GB 2,168,383 and U.S. Pat. No. 5,185,075; complexes of polar aprotic solvents with protonated amines as described in U.S. Pat. No. 4,812,951 or the like. Electrolytes for formation of the dielectric on the anode including aqueous solutions of dicarboxylic acids, such as ammonium adipate are also known. Other materials may be incorporated into the dielectric such as phosphates, citrates, etc. to impart thermal stability or chemical or hydration resistance to the dielectric layer.

A conductive layer is formed, 102, on the surface of the dielectric. The conductive layer acts as the cathode of the capacitor. The cathode is a conductor preferably comprising at least one conductive material selected from manganese dioxide and a conductive polymeric material. Particularly preferred conductive polymers include polypyrrole, polyaniline and polythiophene. Metals can be employed as a cathode material with valve metals being less preferred.

After conductive cathode layer formation, 102, a transition layer is applied, 103, by spraying or dipping. In a preferred embodiment a first carbon layer is applied, 104. A blocking layer is applied, 105, by spraying or dipping. After blocking layer formation a second carbon layer is preferably applied, 106, by spraying or dipping.

A metal plated layer is formed, 107, onto the transition layer preferably by electroplating or electroless plating.

The capacitor may be a discrete capacitor or an embedded capacitor. If a discrete capacitor is to be formed, at 108, a conductive adhesive is added, 109, and the metal layer is adhered to a cathode lead, 110. The capacitor is finished, 111, which may include incorporating anode and cathode terminals, external insulation, testing, packing and the like as known in the art.

If the capacitors are to be employed in an embedded application or attached directly to a circuit trace the capacitors are finished, 112, which may include testing, packing and the like.

An embodiment of the invention is illustrated in partial cross-sectional view in FIG. 5. In FIG. 5, a cathode, 201, comprises a blocking layer, 202, wherein the blocking layer is a transition layer between the cathode, 201, and a plated metal layer, 203.

The capacitor is illustrated herein as a discrete capacitor for convenience and this is a preferred embodiment. In another preferred embodiment the anode wire and metal layer, of the transition layer, may be in direct electrical contact with a circuit trace wherein elements of the circuit may constitute the cathode lead, anode lead or both. In another preferred embodiment the capacitor may be embedded in a substrate or incorporated into an electrical component with additional functionality.

EXAMPLES

Example 1

A series of identical tantalum anodes were prepared. The tantalum was anodized to form a dielectric on the tantalum anode in identical fashion. In one set of samples a manganese dioxide cathode was formed on the dielectric with first carbon layer comprising graphite dispersion in acrylic solution was applied. The capacitors with manganese dioxide cathodes were split into three groups. In a first control group a nickel plated layer was formed on the first carbon. In the second control group a silver layer was formed on the first carbon. In the inventive group a hydrophobic coating comprising silicone polymer solution was applied on the first carbon layer. A second carbon layer comprising a mixture of carbon black and graphite dispersion in a polyester binder was applied on the hydrophobic layer. A nickel plated layer was formed on the second carbon by electroplating. Both control and inventive samples were dried and electrical properties were measured. The results are presented in Table 1.

TABLE 1

|  | Leakage (microamps) | ESR (mohms) |
| --- | --- | --- |
| Plated Layer | 536 | 115 |
| Silver Layer | 1.3 | 57.6 |
| Inventive | 1.25 | 42.8 |

Table 1 clearly illustrates the advantages of the present invention, particularly, with regards to a decrease in leakage current and ESR.

Example 2

On an identical set of samples a polymeric cathode was formed utilizing polyethylenedioxythiophene (PEDT) with carbon layers applied thereto respectively. The capacitors with PEDT cathodes were split into three groups. In a control group a nickel plated layer was formed on a first carbon layer comprising a carbon black and graphite dispersion in a polyester binder solution was applied. In the second control group, a carbon and silver layer was applied on a PEDT cathode. In the inventive group a hydrophobic coating comprising a silicone polymer solution was applied on the first carbon layer. A second carbon layer similar to the second carbon layer of Example 1 was applied on the hydrophobic layer. A nickel plated layer was formed on the second carbon by electroplating. Both control and inventive samples were dried and electrical properties were measured. The results are provided in Table 2.

TABLE 2

|  | Leakage (microamp) | ESR (mohms) |
| --- | --- | --- |
| Plated Layer | 312.5 | 41.93 |
| Silver Layer | 3.01 | 47.6 |
| Inventive | 0.95 | 66.5 |

Table 2 clearly illustrates the advantages offered by the present invention, particularly, with regards to leakage current.

Example 3

On an identical set of samples a polymeric cathode was formed utilizing polyethylenedioxythiophene (PEDT) polymers. The capacitors with PEDT cathodes were split into three groups. In the first control group a carbon layer was applied on PEDT followed with Nickel plating. In a second control group a carbon and silver layer was applied on the PEDT cathode. In the inventive group, a hydrophobic layer comprises silicone polymer solution was applied on the PEDT cathode. No carbon layer was applied in the inventive group. A nickel plated layer was formed on the hydrophobic layer by electroplating.

Both control and inventive samples were dried and electrical properties were measured. The results are provided in Table 3.

TABLE 3

|  | Leakage (microamps) | ESR (mohms) |
| --- | --- | --- |
| Plated Layer | 85.44 | 18.98 |
| Silver Layer | 5.108 | 22.8 |
| Inventive | 2.67 | 19.3 |

Table 3 clearly illustrates the advantages offered by the present invention, particularly, with regards to leakage current and ESR.

The invention has been described with particular emphasis on the preferred embodiments. One of skill in the art would realize additional embodiments, alterations, and advances which, though not enumerated, are within the invention as set forth more specifically in the claims appended hereto.

The invention claimed is:

1. A capacitor comprising:
   an anode;
   a dielectric on said anode;
   a cathode on said dielectric;
   a transition layer encasing said cathode wherein said transition layer comprises an insulative layer; and
   a plated layer on said transition layer;
   wherein said cathode is electrically connected to a cathode termination through said insulative layer.

2. The capacitor of claim 1 wherein said insulative layer further comprises at least one of a polyhedral oligomeric silesquioxane, silica and nanoclay coated with hydrophobic polymers.

3. The capacitor of claim 1 wherein said insulative layer comprises a crosslinked polymer.

4. The capacitor of claim 1 wherein said insulative layer comprises at least one of a hydrophobic polymer and a hydrophobic additive.

5. The capacitor of claim 1 wherein said insulative layer comprises a thermoset polymer.

6. The capacitor of claim 1 wherein said transition layer does not include a carbon layer.

7. The capacitor of claim 1 further comprising a second blocking layer on a surface.

8. The capacitor of claim 7 wherein said surface has an anode wire extending therefrom.

9. The capacitor of claim 1 wherein said transition layer further comprises a first conductive carbon layer.

10. The capacitor of claim 9 wherein said transition layer further comprises a second conductive layer.

11. The capacitor of claim 10 wherein said second conductive layer comprises carbon.

12. The capacitor of claim 11 wherein at least one of said first conductive carbon layer and said second conductive carbon layer comprises carbon particles selected from the group consisting of graphite, carbon black, carbon nanotubes and graphene.

13. The capacitor of claim 10 wherein a blocking layer is between said first conductive carbon layer and said second conductive layer.

14. The capacitor of claim 13 wherein said blocking layer comprises a polymer.

15. The capacitor of claim 14 wherein said polymer is a polymer of at least one monomer selected from fluorinated monomer and silicone monomer.

16. The capacitor of claim 10 wherein said second conductive layer further comprises metal particles.

17. The capacitor of claim 10 wherein said second conductive layer comprises at least 20% resin by dry weight.

18. The capacitor of claim 1 wherein said transition layer prevents diffusion of electrolyte into said anode.

19. The capacitor of claim 1 wherein said cathode comprises $MnO_2$.

20. The capacitor of claim 1 wherein said cathode comprises a conducting polymer.

21. The capacitor of claim 1 wherein said insulative layer encases said cathode and said dielectric.

22. The capacitor of claim 21 wherein said insulative layer encases a portion of an anode wire.

23. The capacitor of claim 1 wherein said insulative layer is less than two microns thick.

24. A method for forming a capacitor comprising:
providing an anode;
forming a dielectric on said anode;
applying a cathode on said dielectric;
applying a transition layer encasing said cathode wherein said transition layer comprises an insulative layer;
plating a layer on said transition layer; and
electrically connecting a cathode termination to said cathode through said insulative layer.

25. The method for forming a capacitor of claim 24 wherein said plating is by a method selected from the group consisting of electroplating and electroless plating.

26. The method for forming a capacitor of claim 25 wherein said plating is by electroplating.

27. The method for forming a capacitor of claim 24 wherein said transition layer prevents diffusion of plating electrolyte.

28. The method for forming a capacitor of claim 24 wherein said insulative layer comprises a crosslinked polymer.

29. The method for forming a capacitor of claim 24 wherein said insulative layer comprises at least one of a hydrophobic polymer and a hydrophobic additive.

30. The method for forming a capacitor of claim 24 wherein said insulative layer comprises a thermoset polymer.

31. The method for forming a capacitor of claim 24 wherein said transition layer further comprises a first conductive carbon layer.

32. The method for forming a capacitor of claim 31 wherein said transition layer further comprises a second conductive layer.

33. The method for forming a capacitor of claim 32 wherein said second conductive layer comprises carbon.

34. The method for forming a capacitor of claim 32 wherein said insulative layer is between said first conductive carbon layer and said second conductive layer.

35. The method for forming a capacitor of claim 32 wherein at least one of said first conductive carbon layer and said second conductive layer comprises carbon particles selected from the group consisting of graphite, carbon black, carbon nanotubes and graphene.

36. The method for forming a capacitor of claim 32 wherein said second conductive layer further comprises metal particles.

37. The method for forming a capacitor of claim 24 wherein said cathode comprises $MnO_2$.

38. The method for forming a capacitor of claim 24 wherein said cathode termination is a cathode lead.

39. The method for forming a capacitor of claim 24 wherein said insulative layer comprises a polymer.

40. The method for forming a capacitor of claim 39 wherein said polymer is a polymer of at least one monomer selected from fluorinated monomer and silicone monomer.

41. The method for forming a capacitor of claim 24 wherein said transition layer prevents diffusion of electrolyte into said anode.

42. The method for forming a capacitor of claim 24 wherein said cathode comprises a conducting polymer.

43. The method for forming a capacitor of claim 24 wherein said insulative layer encases said cathode and said dielectric.

44. The method for forming a capacitor of claim 43 wherein said insulative layer encases a portion of an anode wire.

45. The method for forming a capacitor of claim 24 wherein said insulative layer is less than two microns thick.

46. The method for forming a capacitor of claim 24 wherein said insulative layer comprises a crosslinked polymer.

47. The method for forming a capacitor of claim 24 further comprising applying a second blocking layer.

48. The method for forming a capacitor of claim 47 wherein said second blocking layer is applied prior to said plating.

49. The method for forming a capacitor of claim 47 wherein said second blocking layer is applied to a surface with an anode wire extending there from.

50. The method for forming a capacitor of claim 24 wherein said insulative layer further comprises at least one of a polyhedral oligomeric silesquioxane, silica and nanoclay coated with hydrophobic polymers.

51. A capacitor comprising:
an anode;
a dielectric on said anode;
a cathode on said dielectric;
a blocking layer encasing said cathode wherein said blocking layer is an insulative layer; and
a plated layer on said blocking layer;
wherein said cathode is electrically connected to a cathode termination through said blocking layer.

52. The capacitor of claim 51 wherein said insulative layer further comprises at least one of a polyhedral oligomeric silesquioxane, silica and nanoclay coated with hydrophobic polymers.

53. The capacitor of claim 51 wherein said insulative layer comprises a crosslinked polymer.

54. The capacitor of claim 51 wherein said insulative layer comprises at least one of a hydrophobic polymer and a hydrophobic additive.

55. The capacitor of claim 51 wherein said insulative layer comprises a thermoset polymer.

56. The capacitor of claim 51 wherein said blocking layer does not include a carbon layer.

57. The capacitor of claim 51 wherein said blocking layer further comprises a first conductive carbon layer.

58. The capacitor of claim 51 further comprising a second blocking layer on a surface.

59. The capacitor of claim 58 wherein said surface has an anode wire extending there from.

60. The capacitor of claim 51 wherein said blocking layer comprises a polymer.

61. The capacitor of claim 60 wherein said polymer is a polymer of at least one monomer selected from fluorinated monomer and silicone monomer.

62. The capacitor of claim 51 wherein said blocking layer prevents diffusion of electrolyte into said anode.

63. The capacitor of claim 51 wherein said blocking layer comprises carbon particles selected from the group consisting of graphite, carbon black, carbon nanotubes and grapheme.

64. The capacitor of claim 51 wherein said cathode comprises $MnO_2$.

65. The capacitor of claim 51 wherein said cathode comprises a conducting polymer.

66. The capacitor of claim 51 wherein said blocking layer encases said cathode and said dielectric.

67. The capacitor of claim 66 wherein said blocking layer encases a portion of an anode wire.

68. The capacitor of claim 51 wherein said blocking layer is less than two microns thick.

* * * * *